Patented Aug. 15, 1933

1,922,909

UNITED STATES PATENT OFFICE 1,922,909

FERTILIZER

Cromwell B. Dickey, Milwaukee, Wis., assignor to Pittsburgh Plate Glass Company, a Corporation of Pennsylvania No Drawing. Application December 29, 1931 Serial No. 583,707

1 Claim. (Cl. 71—6)

My invention relates to a fertilizing material that may be utilized for general application, but which is especially adapted for lawns, golf courses, and the like.

The material may be employed to cause eradication of grubs, worms and certain weeds and at the same time so fertilize the soil as to promote the growth of grass.

The principal object of the invention is to provide a material having the above designated characteristics which shall be clean or free from objectionable dust that presents manifest difficulties in spreading the fertilizer.

Although various ingredients may be mixed to secure satisfactory results, a preferred mixture is formed by combining lead arsenate with a fertilizer of high content of organic matter, such as by-products of sewage disposal plants employing the activated sludge method. A small percentage of adhesive material is added to the mixture to provide a product that is clean and free from dust. The materials are preferably employed in granular form which facilitates thorough mixing and uniform distribution of the various ingredients.

The materials may be utilized in the following proportions to provide a satisfactory product:

| | Pounds |
|---|---|
| Lead arsenate | 40 |
| Powdered glue | 5 |
| Dried activated sludge | 146 |
| Water | 33 |

Other adhesives or binding agents may be substituted for the glue in the foregoing formula such, for example, as gum arabic, casein, wheat flour, gum tragacanth and the like.

If it is desired, the product may be dried and it will remain clean and free from dust. However, slightly better results are secured if the water is permitted to remain in the mixture.

This material may be broadcast by a suitable machine without difficulty because of its dustless character. Obviously the various ingredients may be employed in different proportions than specified in the formula. The principal desideratum is to provide a fertilizer of the type indicated which shall be clean to handle.

What I claim is:

A mixture comprising dried activated sewage sludge 40 to 75 per cent, lead arsenate 15 to 25 per cent, water 5 to 20 per cent and an organic colloid 1 to 6 per cent.

CROMWELL B. DICKEY.